(12) United States Patent
Bailey et al.

(10) Patent No.: US 8,389,096 B2
(45) Date of Patent: Mar. 5, 2013

(54) OPTICAL DATA STORAGE MEDIA HAVING HIGH PRESSURE-AT-BREAK STRENGTH

(75) Inventors: Michael L. Bailey, Gig Harbor, WA (US); Douglas P. Hansen, Spanish Fork, UT (US); Barry M. Lunt, Provo, UT (US); Christopher M. Miller, Pleasant Grove, UT (US)

(73) Assignee: Brigham Young University, Provo, UT (US)

( * ) Notice: Subject to any disclaimer, the term of this patent is extended or adjusted under 35 U.S.C. 154(b) by 378 days.

(21) Appl. No.: 12/731,020

(22) Filed: Mar. 24, 2010

(65) Prior Publication Data

US 2010/0246358 A1 Sep. 30, 2010

Related U.S. Application Data

(60) Provisional application No. 61/210,863, filed on Mar. 24, 2009.

(51) Int. Cl.
*B32B 3/02* (2006.01)

(52) U.S. Cl. ................... 428/64.1; 428/64.4; 430/270.11

(58) Field of Classification Search .................. 428/64.4
See application file for complete search history.

(56) References Cited

U.S. PATENT DOCUMENTS 6,171,675 B1 * 1/2001 Iida .............................. 428/64.4

* cited by examiner

*Primary Examiner* — Elizabeth Mulvaney
(74) *Attorney, Agent, or Firm* — Workman Nydegger (57) ABSTRACT

Optical information media having high pressure-at-break values, and methods for determining pressure-at-break values are disclosed. The media have high structural integrities, and are designed to confer greater resistance to delamination forces as compared to conventional optical information media.

18 Claims, 4 Drawing Sheets

OPTICAL DATA STORAGE MEDIA HAVING HIGH PRESSURE-AT-BREAK STRENGTH

This application claims the benefit of U.S. Provisional Application No. 61/210,863 entitled "OPTICAL DATA STORAGE MEDIA HAVING HIGH PRESSURE-AT-BREAK STRENGTH" filed on Mar. 24, 2009.

FIELD OF THE INVENTION

The invention relates to long-term digital data storage media, and more specifically, to media having high pressure-at-break values.

DESCRIPTION OF RELATED ART

Optical discs are widely used in the commercial and consumer markets to store data. Despite the common belief that discs last "forever", optical discs fail over time and result in the loss of data. Users seeking to avoid loss of data must engage in costly and time-consuming "data rotation", essentially serial copying of the data from old discs to new discs on a preset schedule.

One of the major sources of disc failure is delamination, where one or more layers of the disc separate and make the disc unreadable. Physical bending, moisture, heat, temperature changes, or other stressors can cause delamination.

The following is a sample of references discussing optical disc failure mechanisms, including delamination.

Members of the Library of Congress reported preliminary results of accelerated aging studies ("Longevity of CD media: Research at the Library of Congress", September 2003). Three major types of observable failures were identified: formation of spots, disappearance of the metal layer, and peeling or flaking off of the metal layer. The delamination was observed with a CD that had been cycled between hot and cold temperatures.

The glue adhesive used to hold a DVD together can be a source of failure ("CDs and DVDs not so immortal after all", USA Today, May 5, 2004). Bending the DVD when removing it from a case can exacerbate this problem, as flexing places strain on the glue.

Members of the National Institute of Standards and Technology published a study of error rates caused by exposing recordable optical discs to harsh conditions (Slattery, O. et al., *J. Res. Natl. Inst. Stand. Technol.*, 109: 517-524 (2004)). Accelerated aging test under increased temperature and humidity were conducted, along with prolonged exposure to direct light. The tests showed variability within samples of a particular type of discs, that is, discs of the same format performed differently under the tested conditions. The tests also showed that some discs performed well in the temperature and humidity tests, but not in the light exposure tests, and vice versa.

Exposure to both elevated temperatures and humidity was found to cause a variety of defects in a sampling of commercial CD and DVD discs (Iraci, J. *Restaurator*, 26: 134-150 (2005)). Types of damage observed included delamination, fading of dye colors, formation of bubbles within the discs, and changes in PI (parity inner) and BLER (block error rate) values.

Measuring BLER values for CDs and magnetic tapes, and PIEs for DVDs under various environmental conditions were suggested as a way to quantify the quality of various media for archival use (Navale, V., "Predicting the Life Expectancy of Modern Tape and Optical Media", *RLG DigiNews*, 9(4), Aug. 15, 2005). Navale reviewed several government studies including those discussed in the above paragraphs.

Despite the many advances in optical disc manufacture, delamination remains a key weakness in the longevity of stored data. Accordingly, there exists a need for optical discs having higher pressure-at-break values than are currently commercially available.

SUMMARY OF THE INVENTION

Optical information media having high pressure-at-break values are disclosed, as are methods for their analysis. The methods can be used to test any optical media disc. The high pressure-at-break media have high structural integrity, and therefore, have higher resistance against delamination than do conventional commercial products. Measuring these values is helpful in designing new materials, as well as monitoring the long term stability of media over time.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Materials

One embodiment of the present invention is directed towards an optical information medium having a straight-pull pressure-at-break strength of at least about 100 psi (about 689 kPa). Higher pressure-at-break strengths indicate that the medium is stronger and more resistant to delamination forces. As such, higher strength values are preferred. For example, the pressure-at-break strength can be at least about 145 psi (about 1000 kPa), at least about 160 psi (about 1103 kPa), at least about 175 psi (about 1207 kPa), at least about 200 psi (about 1379 kPa), at least about 250 psi (about 1724 kPa), at least about 300 psi (about 2068 kPa), at least about 350 psi (about 2413 kPa), at least about 400 psi (about 2757 kPa), at least about 450 psi (about 3102 kPa), at least about 500 psi (about 3447 kPa), about 550 psi (about 3792 kPa), or at least about 600 psi (about 4138 kPa). The pressure-at-break strength can be between any of these values.

Pressure-at-break strength can be easily measured through use of commercially available pull-test machines such as an Instron Universal Testing System. Opposite faces of the optical information medium are adhered to respective metal bolts, and the system pulls the respective bolts away from each other until the medium breaks. The system pulls the medium apart in a straight line, with the two bolts pulling in directly opposite directions along a line perpendicular to a flat extent of the medium. That is, the pulling forces are applied at right angles to the surface of the medium. The system measures and reports the pressure-at-break and load-at-break values. The "at-break" values are sometimes referred to as "ultimate tensile strength" or "UTS" values.

The optical information medium can generally be any shape and size. A currently preferred shape is a flat, round disc. Other shapes include a drum or a linear tape. Currently envisioned media include flat, round shapes in sizes including about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter.

A cross-section view of the optical information medium can be symmetrical or asymmetrical. The cross-section is most commonly asymmetrical.

The medium can comprise at least one support substrate and at least one data layer. The medium can further comprise various layers such as at least one reflective layer and/or at least one dielectric layer. The data layer can comprise one or more marks such as phase contrast marks, protuberances, or physical data marks. Data marks are commonly referred to by their length in units of "T". For example, data can be written as a combination or mixture of one or more of 3T, 4T, 5T, 6T, 7T, 8T, 9T, 10T, 11T, 12T, 13T, and 14T marks.

The optical information medium can be configured in multiple different ways in order to achieve the specified pressure-at-break strength.

Figure 1:
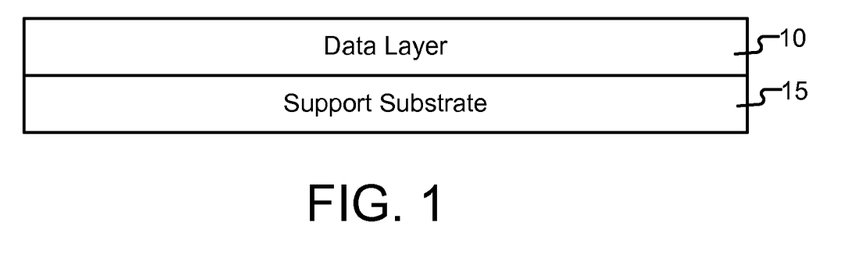
FIG. 1 shows an optical information medium containing only one support substrate and a data layer.

In one configuration shown in FIG. 1, the optical information medium can comprise a data layer 10 and only one support substrate 15. Many commercially available optical discs contain two support substrates, leading in part to their poor pressure-at-strength values. The instant inventors observed that optical information media prepared using only a single support substrate 15 had high pressure-at-strength values. In this first configuration, the optical information medium preferably lacks an adhesive material.

Figure 2:
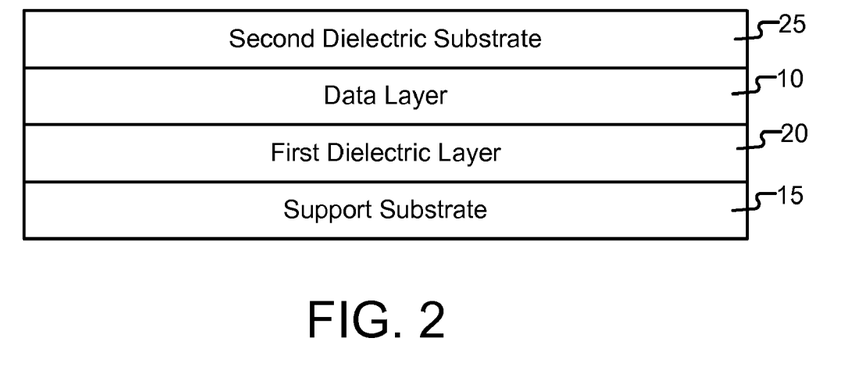
FIG. 2 shows an optical information medium containing only one support substrate, a first dielectric layer, a data layer, and a second dielectric layer.

The data layer 10 can facially contact the support substrate 15, as shown in FIG. 1, or there can be one or more intervening layers between the support substrate 15 and the data layer 10. In one embodiment shown in FIG. 2, the optical information medium contains a support substrate 15, a first dielectric layer 20, a data layer 10, and a second dielectric layer 25. The support substrate 15 facially contacts the first dielectric layer 20, the first dielectric layer 20 facially contacts the data layer 10, and the data layer 10 facially contacts the second dielectric layer 25.

Figure 3:
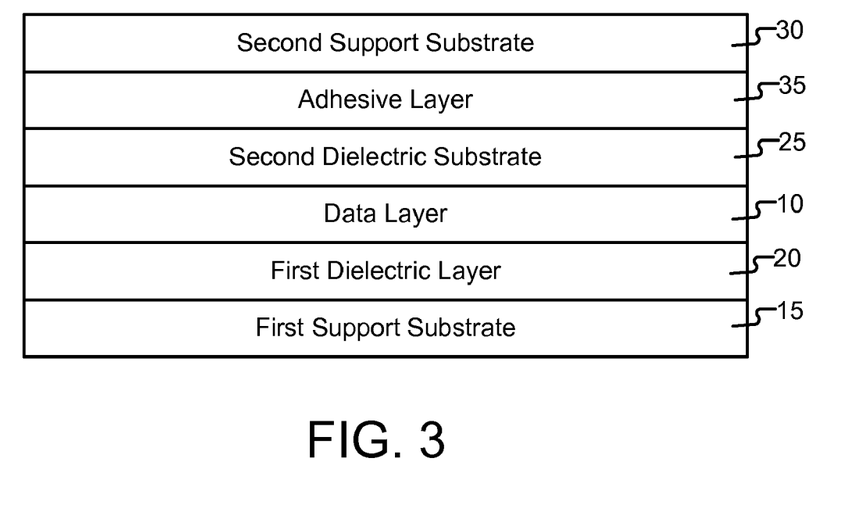
FIG. 3 shows an optical information medium containing a first support substrate, a first dielectric layer, a data layer, a second dielectric layer, an adhesive layer, and a second support substrate.

In another embodiment, the optical information medium can comprise a data layer 10, a first support substrate 15, a second support substrate 30, and an adhesive layer 35. The adhesive layer 35 facially contacts the second support substrate 30 in order to provide high pressure-at-strength values. The adhesive layer 35 preferably facially contacts the second support substrate 25 across its entire surface. Additionally, the data layer 10 facially contacts the first support substrate 15 and is deposited or created in a manner to create a strong chemical or covalent bond with the first substrate 15. Dielectric layers 20 and 25 may be added on one or both sides of the data layer 10, if desired, as shown in the example of FIG. 3. These dielectric layers 20, 25 may also be chemically or covalently bonded to the first support substrate 15 and the data layer 10. This can provide a solid foundation of layers on the first support substrate 15 to which the second support substrate may be bonded. In contrast, many commercially available optical discs contain an adhesive that is only somewhat effective in certain regions of the discs. For example, the adhesives may only have good bonding at the very extreme inner and outer edges of the discs. This causes the low pressure-at-strength values observed in conventional optical information media by the instant inventors.

The adhesive layer 35 comprises at least one adhesive material. Examples of adhesive materials include polyurethanes, polyurethane acrylates, polyepoxides, polyester acrylates, polyphenolic resins, acrylics, polystyrene spheres, glass rods, or carbon nanotubes.

In the example shown in FIG. 3, the optical information medium contains a first support substrate 15, a first dielectric layer 20, a data layer 10, a second dielectric layer 25, an adhesive layer 35, and a second support substrate 30, in this order. That is, the first support substrate 15 facially contacts the first dielectric layer 20; the first dielectric layer 20 facially contacts the data layer 10; the data layer 10 facially contacts the second dielectric layer 25; the second dielectric layer 25 facially contacts the adhesive layer 35; and the adhesive layer 35 facially contacts the second support substrate 30. It is to be understood that other intervening layers may be included without limitation. For example, reflective layer(s), heat dissipative layer(s), thermal barrier layer(s), adhesion promotion layer(s), and/or other layer(s) may be placed at any position in the stack of layers without limitation. Furthermore, any combination of details from any of the embodiments shown or described herein may be implemented without limitation.

Figures 4, 5A:
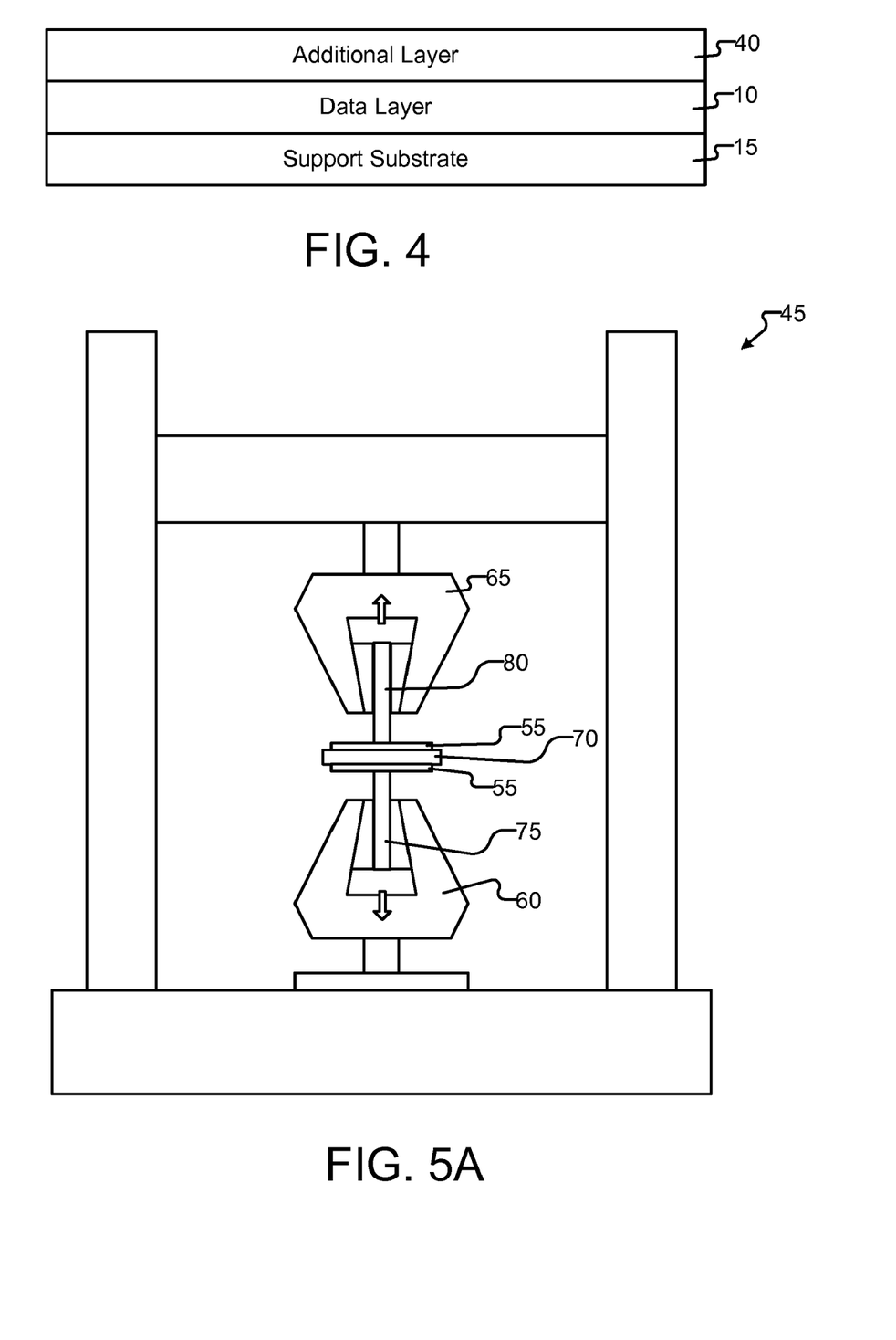
FIG. 4 shows an optical information medium having an additional layer applied to a top of the stack.
FIG. 5A shows a diagrammatic view of a tensile strength testing machine having a first sample fixture and a second sample fixture secured in respective jaws of the machine and with the test sample secured between the first sample fixture and the second sample fixture.

In a further embodiment shown in FIG. 4, an optical information medium has at least one additional layer 40 atop the data layer 10 such that the medium includes at least the support substrate 15, the data layer 10, and the additional layer 40 in that order. In one embodiment, the additional layer may take the form of a hard coat or protective layer such as is applied to a Blu-Ray disc, for example. The additional layer 40 may be applied to media of any format. Such a layer 40 may be spun on and may have any thickness. For example, the spun on layer 40 may have a thickness of about twenty-five micrometers to about one hundred and fifty micrometers. In another configuration, the additional layer 40 may be deposited by sputtering, vapor deposition, or in any other manner. The thickness of a deposited additional layer 40 may be of any thickness without limitation.

It is to be understood that the optical information medium may be provided in any of a variety of forms and may have any of a variety of formats. For example, when the medium is a Blu-Ray or HD DVD type medium, the data layer may be written to include at least one of 2T, 3T, 4T, 5T, 6T, 7T, 8T, 9T, and 10T data marks. On the other hand, when the medium is in a generally DVD format, it may be written to include one or more of 3T, 4T, 5T, 6T, 7T, 8T, 9T, 10T, 11T, and 14T marks.

FIG. 5A shows a diagrammatic view of a tensile strength testing machine 45 having a first sample fixture 50 and a second sample fixture 55 secured in respective jaws 60, 65 of the machine 45. A test sample 70 is shown between the first sample fixture 50 and the second sample fixture 55, and may be secured to the sample fixtures 50, 55 by bonding adhesive. The machine 45 operates to apply a tensile force to sample fixture shafts 75, 80. The machine can move the sample fixtures away from each other at a predetermined rate and can record the resulting force over time. The maximum force typically occurs just prior to failure of the sample. This maximum force value may be used to calculate the pressure-at-break based on the area over which the force is applied by the sample fixtures 50, 55.

Figures 5B, 5C:
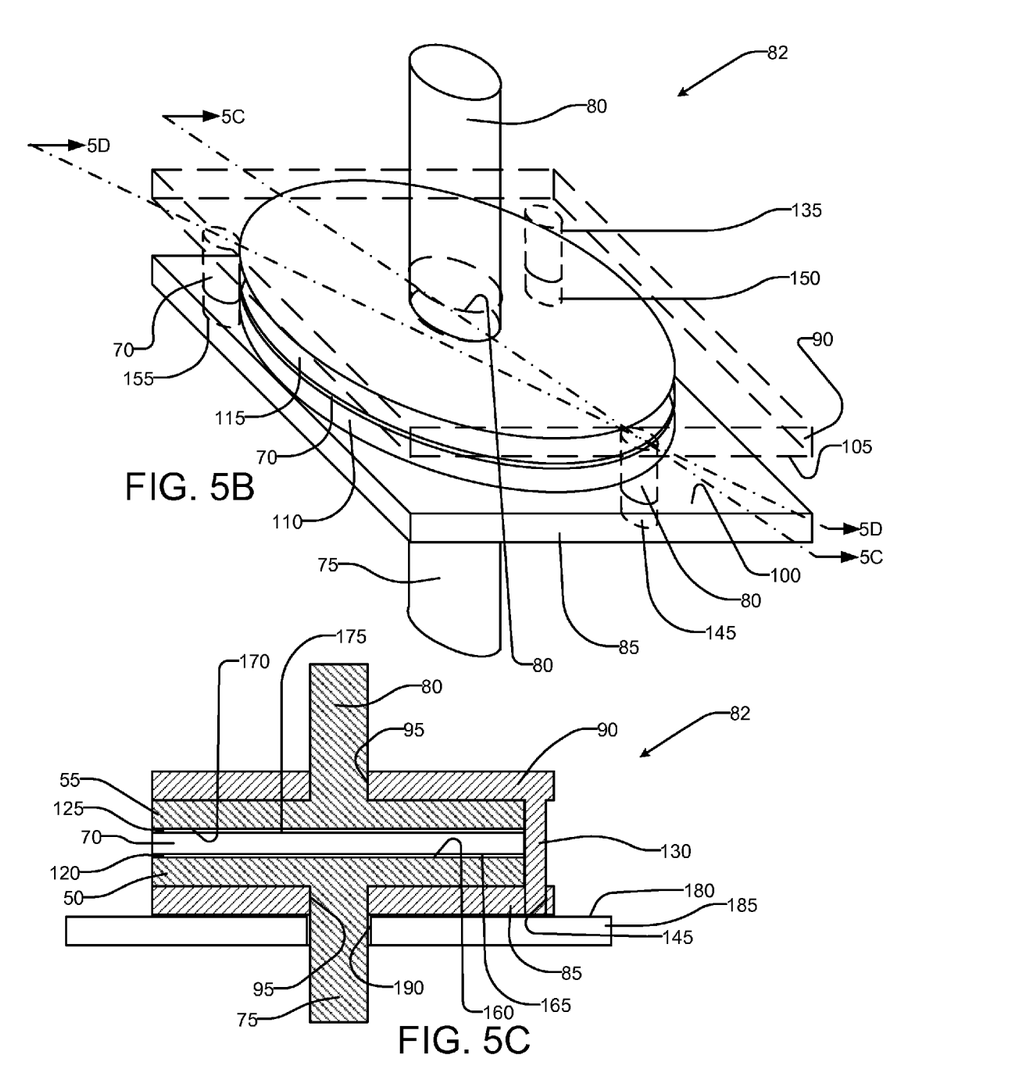
FIG. 5B shows a perspective view of a pair of mounting brackets with a pair of sample fixtures and a sample held between the mounting brackets for aligning the sample fixtures and the test samples during sample preparation.
FIG. 5C shows a sectional view taken along line 5C-5C of FIG. 5B, illustrating the aligning and holding structure for the sample fixtures and sample.

FIG. 5B shows a perspective view of a sample preparation assembly 82. The sample preparation assembly 82 may include a pair of mounting brackets 85, 90 with the pair of sample fixtures 50, 55 and the sample 70 held between the mounting brackets 85, 90. One purpose of the preparation assembly is for aligning the sample fixtures 50, 55 and the test sample 70 during sample preparation. Another purpose is to keep all of the elements flat and parallel to each other. Each mounting bracket 85 has an opening 95 through which a respective sample fixture shaft 75, 80 extends. The openings 95 have inner surfaces that provide a constraining fit or a tight fit that holds the shafts 75, 80 perpendicular to a plane of each sample engaging surface 100, 105 of the mounting brackets 85, 90. The sample fixtures 50, 55 have sample engaging plates 110, 115 that are flat and/or that maintain a parallel relationship between the fixture engaging surfaces 100, 105 and respective faces of the sample 70. Where the sample 70 is flat with parallel opposite flat faces, each of the elements 85, 110, 70, 115, and 90 are held parallel to all the others. This structure facilitates bonding the sample fixtures 50, 55 to the sample 70 with a uniform thickness of bonding adhesive 120, 125 across an entire respective surface of the sample 70 as shown in FIG. 5C. When the bonding adhesive is evenly spread and has a uniform thickness, the strength against failure in the bonding adhesive layer will be uniform across the adhesive layer. Furthermore, when an adhesive is selected to have greater strength than the other layers and other interfaces between layers, the pull test can effectively show the weakest layer or layer interface.

Figure 5D:
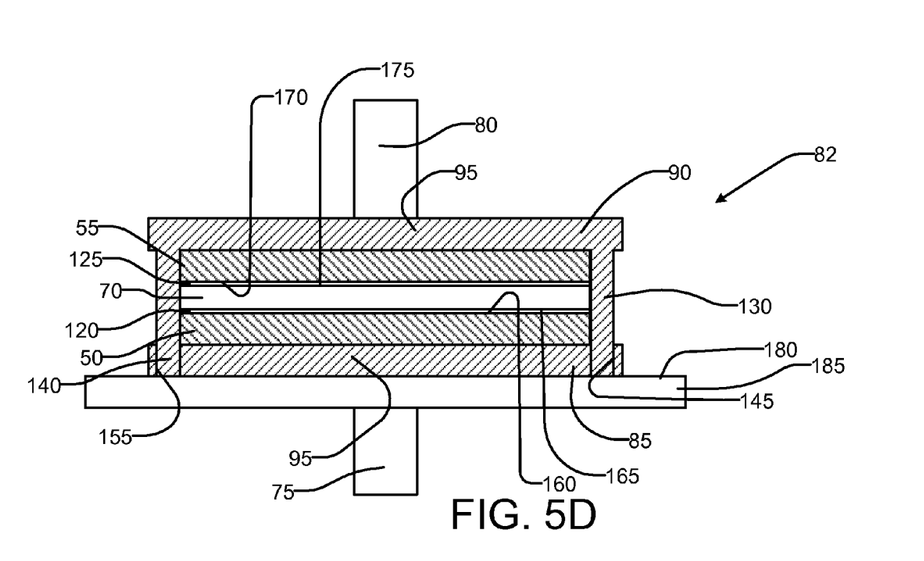
FIG. 5D shows a sectional view taken along line 5D-5D of FIG. 5B, illustrating the aligning and holding structure for the sample fixtures and sample.

In addition to keeping the sample fixtures flat and parallel during bonding, the mounting brackets 85 and 90 also have aligning structure for aligning the first sample fixture 85, the second sample fixtures 90, and the sample 70 with each other during bonding of the fixtures 85, 90 to the sample 70. Alignment also functions to center the sample fixtures 50, 55 and the sample on the line along which the straight pull will be applied during the straight pull pressure-at-break test. In the embodiment illustrated in FIG. 5B, the aligning structure includes at least three pins 130, 135, and 140 that are integral with or fixed to the second mounting bracket 90. These pins 130, 135, and 140 extend into respective through openings 145, 150, 155 in the first mounting bracket 85. Other complementary aligning structure may be incorporated on the first mounting bracket 85 and the second mounting bracket 90 in place of or in addition to the pins 130, 135, 140 and the through openings 145, 150, and 155. In one example, the pins and the through openings are reversed with regard to the mounting bracket on which they are located. In any case, the pins, openings, and/or other aligning structure may be configured to engage edges of each of the first sample fixture 50, the second sample fixture 55, and the sample 70 in at least three locations to positively locate these elements in axial alignment with each other and centered on the straight pull line. In order to do this, the through openings 145, 150, and 155 are sized to receive the pins 130, 135, and 140 in a close fit. Also, the pins 130, 135, and 140 are oriented to extend perpendicularly between the first fixture engaging surface 100 and the second fixture engaging surface 105. This configuration holds the sample 70 in alignment with the first sample fixture 50 and the second sample fixture 55, and maintains a parallel relationship between the brackets 85, 90, fixture engaging plates 110, 115, and the sample 70, as shown in FIGS. 5C and 5D. This configuration also centers the sample 70, the first sample fixture 50, and the second sample fixture 55 on the straight pull line.

FIG. 5C shows a sectional view taken along line 5C-5C of FIG. 5B and further illustrates the aligning and holding structure of the mounting brackets 85, 90 for the first sample fixture 50, the second sample fixture 55, and the sample 70. Also shown in FIG. 5C, is the bonding adhesive 120, which distributes evenly between an inner surface 160 of the first sample fixture 50 and a first face 165 of the sample 70. Bonding adhesive 125 also distributes itself evenly between an inner surface 170 of the second sample fixture 55 and a second face 175 of the sample 70. By placing the assembly 82 of brackets 85, 90, fixtures 50, 55, and sample 70 on a substantially level or horizontal surface 180 of a table 185 or other structure having an opening 190 for receiving the shaft 75 of the sample fixture, the bonding adhesive distributes itself evenly under the influence of gravity. The weight of the second sample fixture 55 and the second mounting bracket 90 in addition to any capillary action between surfaces 160, 165, 170, and 175 help to evenly distribute the bonding adhesive 120, 125. As shown in FIG. 5C, the pin 130 is received in through opening 145 when the brackets 85, 90, fixtures 50, 55, sample 70, and bonding adhesive 120, 125 are in an assembled state for uniform or even bonding in preparation for the straight pull pressure-at-break test shown in FIG. 5A.

FIG. 5D shows another sectional view taken along line 5D-5D of FIG. 5B, illustrating the aligning and holding structure of the mounting brackets 85, 90 for the first sample fixture 50, the second sample fixture 55, and the sample 70. Also shown in FIG. 5D, is the bonding adhesive 120, which distributes evenly between an inner surface 160 of the first sample fixture 50 and a first face 165 of the sample 70. Bonding adhesive 125 also distributes itself evenly between an inner surface 170 of the second sample fixture 55 and a second face 175 of the sample 70. By placing the assembly 82 of brackets 85, 90, fixtures 50, 55, and sample 70 on the substantially level or horizontal surface 180 of the table 185 or other structure having the opening 190 for receiving the shaft 75 of the sample fixture, the bonding adhesive distributes itself evenly under the influence of gravity. The weight of the second sample fixture 55 and the second mounting bracket 90 in addition to any capillary action between surfaces 160, 165, 170, and 175 help to evenly distribute the bonding adhesive 120, 125. As shown in FIG. 5D, the pins 130, 140 are received in through openings 145, 155 when the brackets 85, 90, fixtures 50, 55, sample 70, and bonding adhesive 120, 125 are in the assembled state for uniform or even bonding in preparation for the straight pull pressure-at-break test shown in FIG. 5A.

Methods of Evaluating Optical Information Media

An additional embodiment of the invention is directed towards methods of evaluating the integrity of an optical information medium. The method can comprise providing an optical information medium, and determining the straight-pull pressure-at-break value of the optical information medium. The method can further comprise comparing the pressure-at-break value of the tested optical information medium against the value of a standard medium or other medium against which the comparison is desired.

The pressure-at-break value can be easily measured as described in the previous section.

The methods can be used in product development, where various optical information media can be compared to select one or more attractive designs that afford high pressure-at-break values.

The methods can be used in quality control ("QC")/quality assurance ("QA") programs to assay the quality of manufactured optical information media. The sampled media can either be compared to a positive control sample, or against a predetermined "acceptable" numerical value. The QC/QA programs can include exposing the media to one or more stressors such as heat, cold, light, moisture, or flexing.

Figure 6:
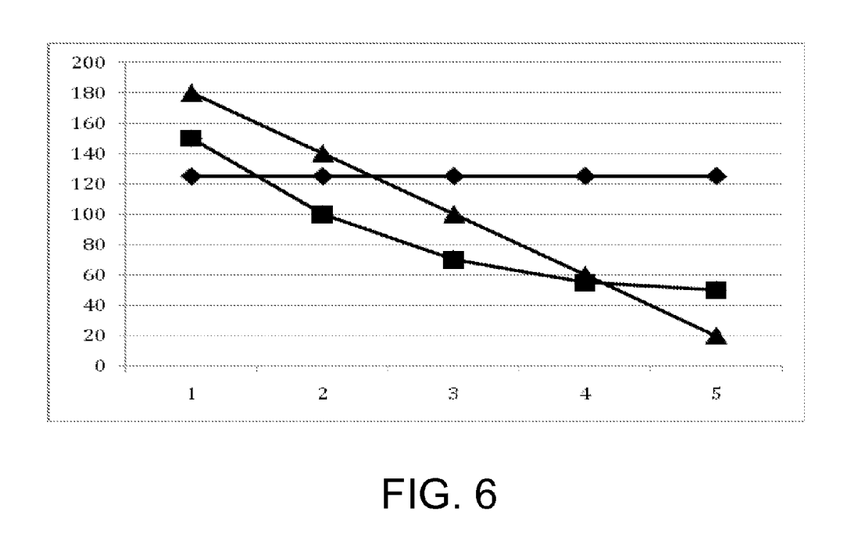
FIG. 6 shows a sample graph of pressure-at-break values with respect to time.

The methods can also be used to assay structural integrity over time as a form of an aging study, where samples of an optical information media can be analyzed at multiple time points to determine if any reduction in structural integrity is occurring over time. The pressure-at-break values can be plotted against time, as shown in the example of FIG. 6. FIG. 6 shows a sample graph of pressure-at-break values with respect to time. This type of graph can be used to evaluate changes in structural integrity of an optical information medium caused by aging. The x-axis represents time; the y-axis is pressure-at-break values. The time periods along the x-axis may be arbitrarily selected. In the graph, a flat, horizontal line (diamond symbols) indicates no changes to structural integrity. A non-flat-horizontally extending line or curve indicates that the structural integrity of the optical information medium is changing over time. In FIG. 6, the curve represented by triangle symbols shows a linear decrease. The curve represented by square symbols shows a non-linear decrease. A straight horizontal line would indicate no negative effects caused by aging, while a line or curve descending to the right (a declining line or curve) would indicate negative effects caused by aging. Such a graph may have arbitrarily assigned time periods or values and the associated line/curve shapes that come from testing.

An additional embodiment of the invention is directed towards methods of identifying the weakest layer or layer interface in an optical information medium. The method can comprise providing an optical information medium having multiple layers and multiple layer interfaces, performing a straight-pull test until the medium breaks to form a broken medium, and examining the broken medium to identify the weakest layer or layer interface at which the medium broke. As an example, an optical information medium can have layers: support substrate, layer A, layer B, layer C, and polymer coating. The examining step can be performed visually by eye, using a camera, and/or other machines. Visual analysis of the broken medium might show layer B on one face of the broken medium, and layer C on the other face of the broken medium. This result would indicate that the interface between layers B and C is the weakest interface in the medium. Alternatively, if visual analysis of the broken medium shows layer B on both faces of the broken medium, this would indicate that the internal bonding of layer B is the weakest part of the medium. These methods can provide valuable information while designing and testing new optical information media materials.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Commercial Disc Products

Delkin Archival Gold DVD-R discs (Delkin Devices, Inc.; Poway, Calif.) were purchased. The discs did not have a listed lot or serial number, but had an inner ring stamper code of 7093 D21 01520 5G.

Example 2

Preparation of MD Discs

A single 0.6 mm thick polycarbonate support substrate was used with logic consistent with rewriteable discs. The layers deposited in order were 19.5 nm carbon sputtered with 2% carbon dioxide in argon, 20 nm of tellurium sputtered with 2% carbon dioxide in argon, 13 nm of carbon sputtered with 2% carbon dioxide in argon, and 2 microns of a hard coating cured for 15 minutes with a 14 W UV-C lamp. The hard coat material was product SK1110 (lot number 8G03) from Sony Chemical & Information Device Corp. (Tokyo, Japan).

Example 3

General Method to Measure Pressure-at-Break Values

Six one-inch (about 2.54 cm) diameter circular samples were cut from each disc using an Epilog Legend EXT programmable laser cutter with 120 W power (Epilog Laser Company; Golden, Colo.). It was noted that the laser cutter melted the edge of the commercial disc samples, which would result in an artificially high pressure-at-break value. In order to avoid this problem, the melted edge was removed by hand using a razor blade.

Two elevator bolts were glued, one onto each side of the sample using Araldite 2012 two-part epoxy (Batch AK8EP8939K; Huntsman Advanced Materials Americas, Inc.; Los Angeles, Calif.). The samples were allowed to cure at room temperature for 24 hours in order for the epoxy to fully harden. Two nuts were threaded onto each bolt to facilitate attachment to a Pull-Test machine.

The samples were loaded into the Pull-Test machine: model 4204 Instron Universal Testing Machine (Instron Corp.; Norwood, Mass.). The machine pulled the sample apart until failure of the sample material. The machine recorded the force necessary to do so, and reported the "pressure-at-break" value for each sample.

Example 4

Pressure-at-Break Test Results

The following results were obtained from testing Delkin Archival Gold discs and MD discs using the method described in the previous Example.

| Type of disc | Sample | Load-at break (lbf) | Pressure-at-break in psi (kPa) |
|---|---|---|---|
| Delkin | A | 25.23 | 32 (220 kPa) |
| MD | A | 539 | 686 (4730) |
|  | B | 373 | 475 (3275) |
|  | C | 486 | 619 (4268) |
|  | D | 397 | 506 (3489) |
|  | E | 596 | 759 (5233) |
|  | F | 495 | 630 (4344) |
|  | MD average | 481 ± 84 | 612 ± 107 (4220 ± 738) |

Interpreting these numbers requires some caution. About half the time, the MD sample failed at the epoxy interface. This implies that the inter-molecular bonds in the MD sample are stronger than the molecular bonds in a highly cross-linked epoxy. Furthermore, of the Delkin DVD samples, only one held together long enough to be tested in the Instron machine. The other samples fell apart as they were handled in preparation for testing. This implies that a small amount of melted polycarbonate was left on the edge of the one sample and that the 32 psi (220 kPa) pressure-at-break value is probably artificially high.

Visual inspection of the broken Delkin discs indicated that the discs failed at the dye-metal reflective layer interface. This result identifies this interface as the weakest point in the disc.

Prophetic Example 5

Pressure-at-Break Test for Whole Discs

Entire, intact discs can be tested with the Instron Universal Testing Machine by use of a pair of larger elevator bolts or other shafts. Large bolts having a 11.8 mm diameter can be attached perpendicularly at centers of opposing outer surfaces of flat plates of steel or aluminum substantially the same diameter as the sample media. These flat plates with the bolts protruding from one outer surface form sample fixtures. The sample disc can be bonded to each of two inner surfaces of respective sample fixtures opposite the large bolts so that the sample is between the inner surfaces of two oppositely facing sample fixtures. A bonding adhesive that is stronger than layers and interfaces of layers in the sample disc can be used so that failure will more likely occur in the sample disc and not at the adhesive that bonds the sample to the sample fixtures. After curing, the bolts can be inserted in respective jaws of the Pull-Test machine, the sample can be pulled apart, and the pressure-at-break can be determined.

Prophetic Example 6

Preparation of Whole Disc Samples

Conventional DVD or high pressure-at-break discs can be prepared for testing by a preliminary step of sanding the outer flat surfaces of the discs to improve bonding by the bonding adhesive to a first sample fixture and a second sample fixture. The sample discs can also be prepared in a manner that assures that the large bolts or other shafts that are attached to the Pull-Test machine are aligned with each other and that these bolts are attached to the discs at their centers on both opposite faces of the discs. This is achieved by assuring that a flat plate of the first sample fixture is adhered to substantially an entire flat surface on a first flat face of the sample disc. Similarly, a flat plate of the second sample fixture is adhered to substantially an entire flat surface on a second flat face of the sample disc opposite to the first flat face. The first sample fixture and the second sample fixture can be aligned with each other and with the sample disc if the sample fixtures are the same size and shape as the sample disc and if they are all aligned. For round sample discs, the sample fixtures can be provided to have the same diameters as the sample discs. As described in this and the previous example, a large bolt or shaft for attachment to the Pull-Test machine would be attached to the sample fixtures at a center of each fixture so that aligning the first sample fixture with the second sample fixture also aligns their respective bolts or shafts.

Example 7

Preparation of Whole Disc Samples

In order to fix the sample fixtures to the sample in an aligned and flat configuration, mounting brackets having positioning structure were used. A first mounting bracket having a first flat surface and at least three positioning pins was placed on a level surface with the first flat surface facing upward and the three positioning pins extending upward to receive and engage the sample fixtures and the sample therebetween in aligned positions relative to each other. The first mounting bracket also has a shaft receiver recessed at a center of the first flat surface for receiving the large bolt of the first sample fixture. As a first step in forming a sample disc assembly, a bonding adhesive was applied to one or both of a first bonding surface of the first sample fixture and the first face of the sample disc. Then, the first sample fixture was placed on the first surface of the mounting bracket between the positioning pins, and the sample disc was also placed between the positioning pins with its first face in mutually facing relation with the first bonding surface of the first sample fixture for bonding in proper relative alignment. Next, the bonding adhesive was applied to at least one of the second face of the sample disc and a second bonding surface of the second sample fixture, and the second bonding fixture was placed between the positioning pins with the second bonding surface in mutually facing relation with the second face of the sample disc for proper alignment and bonding of the second sample fixture with the sample disc and the first sample fixture.

A second mounting bracket having through holes positioned to receive the three positioning pins of the first mounting bracket and a shaft receiver centered similarly to the shaft receiver of the first mounting bracket was provided. As a next step, the second mounting bracket was placed atop the sample fixtures and the sample disc. The positioning pins were received in the through holes of the second mounting bracket to assure proper alignment of the second mounting bracket with the sample fixtures and the sample disc. The first mounting bracket and the second mounting bracket were each provided as being completely flat plates of homogenous material so that the sample disc was completely flat during bonding of the sample fixtures to the sample disc. Also, the second mounting bracket applied an even distribution of weight across the entire second sample fixture, the second face of the sample disc, and each subjacent layer. In this way, gravitational forces in combination with the flat orientation of the sample disc evenly distributed the bonding adhesive and assured a substantially uniform thickness in each of the adhesive layers prior to curing. Thus, the first bonding surface of the first sample fixture was bonded parallel to the second bonding surface of the second sample fixture. Once the bonding adhesive was cured, the sample and the fixtures were ready to be inserted as a unit into the Pull-Test machine.

It is expected that preparing disc samples in this way will result in a structure that distributes the force applied by the Pull-Test machine evenly across the entire disc samples along a straight line in a direction that is substantially perpendicular to a plane defined by the flat extent of the disc samples. The disc samples prepared in this way can be evaluated for their pressure-at-break values, as described in the previous example.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

What is claimed is:

1. An optical information medium, comprising:
   at least one support substrate and at least one data layer, characterized as having an average straight-pull pressure-at-break value of at least about 145 psi (about 1000 kPa);
   wherein:
      the average value is based on a pressure-at-break values for at least five randomly selected sample media being pulled apart along a line perpendicular to a plane defined by a flat extent of the media; and
      the pressure-at-break values used in calculating the average value are only from samples that failed in the media.

2. The optical information medium of claim 1, wherein the average straight-pull pressure-at-break value is at least about 160 psi (about 1103 kPa).

3. The optical information medium of claim 1, wherein the average straight-pull pressure-at-break value is at least about 175 psi (about 1207 kPa).

4. The optical information medium of claim 1, wherein the average straight-pull pressure-at-break value is at least about 200 psi (about 1379 kPa).

5. The optical information medium of claim 1, comprising only one support substrate.

6. The optical information medium of claim 1, further comprising an adhesive layer and a second support substrate.

7. The optical information medium of claim 1, wherein the data layer comprises one or more 3T, 4T, 5T, 6T, 7T, 8T, 9T, 10T, 11T, or 14T data marks.

8. The optical information medium of claim 1, wherein the data layer comprises one or more physical data marks.

9. The optical information medium of claim 1, further comprising at least one additional layer atop the data layer such that the medium includes at least the support substrate, the data layer, and the additional layer in that order, and wherein the additional layer is a spun on layer.

10. The optical information medium of claim 1, further comprising at least one additional layer atop the data layer such that the medium includes at least the support substrate, the data layer, and the additional layer in that order, and wherein the additional layer is a deposited layer.

11. The optical information medium of claim 1, wherein the data layer comprises at least one of 2T, 3T, 4T, 5T, 6T, 7T, 8T, 9T, and 10T data marks.

12. A method for evaluating the integrity of an optical information medium, the method comprising:
   providing an optical information medium;
   pulling the optical information medium apart along a straight-pull line that is perpendicular to a plane of a flat extent of the medium; and
   determining a straight-pull pressure-at-break value of the optical information medium for the force applied to the medium at the time of failure of the medium.

13. The method of claim 12, further comprising comparing the straight-pull pressure-at-break value of the optical information medium to the straight-pull pressure-at-break value of a conventional medium.

14. The method of claim 12, further comprising evaluating samples of the optical information medium at multiple points in time to determine if there is a change in pressure-at-break values over time.

15. The method of claim 12, further comprising:
   evaluating samples of the optical information medium at multiple points in time; and
   plotting the pressure-at-break values against time to determine effects caused by aging.

16. A method of identifying the weakest layer or layer interface in an optical information medium, the method comprising:
   providing an optical information medium having multiple layers and multiple layer interfaces;
   performing a straight-pull test by applying opposite forces to outer surfaces of the medium along a line perpendicular to a flat extent of the medium until the medium breaks to form a broken medium; and
   examining the broken medium to identify the weakest layer or layer interface at which the medium broke.

17. The optical information medium as in claim 1, wherein the at least one support substrate comprises one support substrate on each side of the data layer, and the medium further comprises a dielectric later between the data layer and the support substrate.

18. The optical information medium as in claim 1, wherein the at least one support substrate comprises only a single support substrate.

* * * * *